(12) United States Patent
Lejeune

(10) Patent No.: US 8,726,656 B2
(45) Date of Patent: May 20, 2014

(54) POWER ASSEMBLY, ESPECIALLY FOR AN AUTOMOTIVE VEHICLE

(75) Inventor: Marc Lejeune, Lyons (FR)

(73) Assignee: Renault Trucks, St. Priest (FR)

( * ) Notice: Subject to any disclaimer, the term of this patent is extended or adjusted under 35 U.S.C. 154(b) by 400 days.

(21) Appl. No.: 13/063,984

(22) PCT Filed: Sep. 26, 2008

(86) PCT No.: PCT/IB2008/003178
§ 371 (c)(1),
(2), (4) Date: Mar. 15, 2011

(87) PCT Pub. No.: WO2010/035054
PCT Pub. Date: Apr. 1, 2010

(65) Prior Publication Data
US 2011/0239643 A1    Oct. 6, 2011

(51) Int. Cl.
*F02B 33/44* (2006.01)
*F01N 3/00* (2006.01)
*F01N 3/10* (2006.01)
*F01N 5/02* (2006.01)
*F02B 37/00* (2006.01)
*F01N 3/025* (2006.01)

(52) U.S. Cl.
USPC ............. 60/605.1; 60/605.2; 60/286; 60/289

(58) Field of Classification Search
None
See application file for complete search history.

(56) References Cited

U.S. PATENT DOCUMENTS

| | | | | |
|---|---|---|---|---|
| 2,848,866 A | * | 8/1958 | Geislinger | 60/606 |
| 4,179,880 A | * | 12/1979 | Schirmer | 60/39.23 |
| 4,449,370 A | * | 5/1984 | Ream | 60/606 |
| 4,528,012 A | * | 7/1985 | Sturgill | 65/134.6 |
| 5,105,624 A | * | 4/1992 | Kawamura | 60/608 |
| 5,740,673 A | | 4/1998 | Smith et al. | |

(Continued)

FOREIGN PATENT DOCUMENTS

| | | |
|---|---|---|
| CN | 1155619 A | 7/1997 |
| EP | 1408224 A1 | 4/2004 |

(Continued)

OTHER PUBLICATIONS

Chinese Search Report (translation only) for corresponding Chinese App. 2008801312959.

(Continued)

*Primary Examiner* — Thomas Denion
*Assistant Examiner* — Jessica Kebea
(74) *Attorney, Agent, or Firm* — WRB-IP LLP

(57) ABSTRACT

A power assembly includes an internal combustion engine including an air intake line and an exhaust gas line having at least one heat exchanger. The power assembly further includes a Brayton cycle system capable of providing additional power to the main internal combustion engine and that includes a gas compressor, a fuel burning heater and a turbine linked to the compressor so that air is drawn into the compressor where it is pressurized, the pressurized air is further heated by flowing through at least one heat exchanger where it exchanges heat with exhaust gases from the main internal combustion engine, the heated and pressurized air is further heated by the fuel burning heater and is thereafter expanded through the turbine where a first fraction of the work extracted by the turbine is used to drive the compressor and a second fraction of the work extracted by the turbine is used to bring additional energy.

13 Claims, 1 Drawing Sheet

(56) References Cited

U.S. PATENT DOCUMENTS

| | | | |
|---|---|---|---|
| 5,845,481 A * | 12/1998 | Briesch et al. | 60/776 |
| 5,983,628 A * | 11/1999 | Borroni-Bird et al. | 60/274 |
| 6,125,625 A * | 10/2000 | Lipinski et al. | 60/801 |
| 7,434,389 B2 * | 10/2008 | Robel | 60/303 |
| 7,958,873 B2 * | 6/2011 | Ernst et al. | 123/568.12 |
| 2006/0021332 A1 * | 2/2006 | Gaiser | 60/286 |
| 2007/0256424 A1 * | 11/2007 | Briesch et al. | 60/773 |
| 2008/0315589 A1 * | 12/2008 | Malmrup | 290/52 |
| 2009/0223220 A1 * | 9/2009 | Vuk | 60/602 |
| 2011/0167809 A1 * | 7/2011 | Balloul et al. | 60/311 |
| 2011/0265470 A1 * | 11/2011 | Lejeune et al. | 60/597 |

FOREIGN PATENT DOCUMENTS

| | | | | |
|---|---|---|---|---|
| GB | 1522930 A | | 8/1978 | |
| JP | 01053022 A | | 3/1989 | |
| JP | 6453022 A | | 3/1989 | |
| NL | 1022429 C1 | | 7/2004 | |
| WO | 2008102160 A2 | | 8/2008 | |
| WO | WO 2009050534 A1 * | 4/2009 | | F02D 23/00 |

OTHER PUBLICATIONS

JPS6453022A—Mar. 1, 1989 (abstract).
International Search Report for corresponding International Application PCT/IB2008/003178.

* cited by examiner

POWER ASSEMBLY, ESPECIALLY FOR AN AUTOMOTIVE VEHICLE

BACKGROUND AND SUMMARY

The invention concerns a power assembly especially for automotive vehicles, of the type comprising an internal combustion engine.

In today's economy, the demand for energy is expanding and, at the same time, energy (fossil energy such a fuel or non fossil energy such as biofuel) is becoming rarer and consequently more expensive.

Automotive vehicles especially industrial vehicles rely on internal combustion engines using fuel as a source of energy. It is therefore important that internal combustion engines are as efficient as possible.

One of the options for improving the overall efficiency of automotive vehicles can consist in using engines of smaller capacity. Engine downsizing proves to be beneficial on many standpoints such as fuel consumption and exhaust emission. Engine downsizing is a viable option that has many benefits; however the limit is that a vehicle might be underpowered when facing unusually demanding operational circumstances (for example: acceleration phase or steep road) even if the said demanding operational circumstances might account for a small fraction of the vehicle operational life. That is why automotive vehicles are usually over dimensioned to face normal operational conditions.

In this technical context it is desirable to provide a power assembly especially for an automotive vehicle, having an internal combustion engine that can include additional power capacity to face peak operational conditions.

It is also desirable to provide a power assembly having an internal combustion engine wherein an additional power source is efficiently engine.

According to an aspect of the invention, a power assembly is provided, especially for an automotive vehicle, comprising a main internal combustion engine including an air intake line and an exhaust gas line.

According to an aspect of the invention, the power assembly further comprises a Brayton cycle system capable of providing additional power to the main internal combustion engine; the said Brayton cycle system include a gas compressor, a fuel burning heater and a turbine linked to the compressor so that 1) air is drawn into the compressor where it is pressurized, 2) the pressurized air is further heated by flowing through at least one heat exchanger where it exchanges heat with exhaust gases from the main internal combustion engine, 3) the heated and pressurized air is further heated by the fuel burning heater and 4) is thereafter expanded through the turbine where a first fraction of the work extracted by the turbine is used to drive the compressor and a second fraction of the work extracted by the turbine is used to bring additional energy.

The power assembly according to an aspect of the invention includes an internal combustion engine combined with a Brayton cycle system that can bring additional energy so as to meet a peak operational demand. The Brayton cycle system operates according to a known cycle that includes the following four phases: 1) compression, 2) heat addition, 3) expansion, 4) heat rejection. By incorporating a Brayton cycle system in an internal combustion engine, aspects of the invention makes a remarkably efficient use of some energy that is wasted in a conventional internal combustion engine. In a conventional internal combustion engine, the heat that is released in the combustion is mainly wasted. The overall efficiency of the Brayton cycle system is improved by the fact that the pressurized air is heated not only by flowing through the compressor but also by flowing through one or more heat exchangers where further energy in the form of heat is added to the pressurized air. A further beneficial aspect of the invention is that the Brayton cycle system does not require additional cooling capacity. Instead the Brayton cycle system uses some of the heat released in the combustion process.

Therefore, the power assembly according to an aspect of the invention shows significant benefits to an automotive vehicle and especially to an industrial vehicle insofar as:

a vehicle can be equipped with a downsized internal combustion engine that can rely on an additional power capacity provided by a Brayton cycle system, the additional power capacity provided by a Brayton cycle system (i) makes an efficient use of the energy that is normally wasted in heat in an internal combustion engine and (ii) provokes limited disturbances in the overall architecture of the vehicle as it does not require additional cooling capacity.

In an embodiment of the invention, the exhaust line is provided with a heat exchanger where energy in the form of heat from the internal combustion engine exhaust gas is transferred to the pressurized air that flows in the Brayton cycle system.

The heat exchanger in the exhaust line may be arranged upstream of a pollution control device, especially in the case of a device including a SCR catalytic converter, or downstream of said device, especially in the case of a device including a diesel particulate filter (DPF).

In another embodiment of the invention, the internal combustion engine includes an EGR line that recirculates a portion of the exhaust gas back to engine cylinders, the EGR line having an EGR heat exchanger where heat from the EGR gas is transferred to the pressurized air that flows in the Brayton cycle system. In this embodiment of the invention, the pressurized air that can benefit from the heat of the EGR gases which are/generally at a high temperature.

The additional power capacity can be conveniently achieved by an electromechanical device which is capable of converting the mechanical work into electrical energy and which is connected to the turbine.

Further, an electric motor powered by the electrical energy extracted by the electromechanical device can be connected to the vehicle driveline.

According to a further embodiment, a transmission device can connect the turbine to the vehicle driveline to transfer the work extracted by the turbine to the internal combustion engine.

The power assembly can comprise a control unit that includes capable of controlling the operation of the Brayton cycle system according to vehicular operational parameters. In operational terms, the control unit controls the operation of the fuel burning heater to turn it on or off and/or controls the amount of heat generated by the fuel burning heater.

In a preferred embodiment of the invention, the heated air and combustion products produced in the fuel burning heater flow through a pollution control component situated downstream of the turbine.

It is to be noted that the internal combustion engine can be suitably equipped with a turbocharger.

To comply with emission regulations, the heated air and combustion products produced in the burner flow through a pollution control component situated downstream of the turbine.

The power assembly according to an aspect of the invention concerns internal combustion engine can be equipped with a turbochanger and/or the internal engine is a diesel engine.

BRIEF DESCRIPTION OF THE DRAWINGS

The following detailed description of an embodiment of the invention is better understood when read in conjunction with the appended drawing being understood, however, that the invention is not limited to the disclosed embodiment In the drawings.

DETAILED DESCRIPTION

Figure 1:
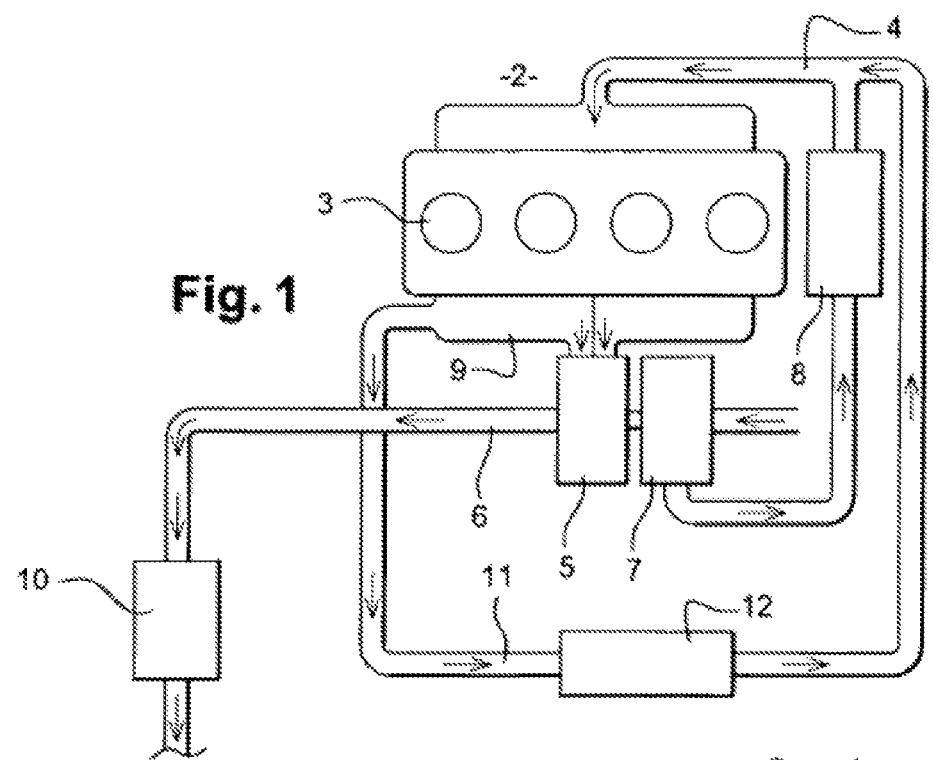
FIG. 1 is a schematic drawing of a conventional internal combustion engine.

FIG. 1 shows a conventional internal combustion engine 2. It can be appreciated that FIG. 1 is a schematic representation of an internal combustion engine and that many details have been omitted for the sake of clarity of the following description.

The internal combustion engine includes an engine block 3 having a plurality of cylinders. Intake air is carried through an intake line 4 feeding the engine cylinders.

The internal combustion engine 2 can commonly include at least one turbocharger that incorporates a turbine 5 located on an exhaust line 6, and a compressor 7, linked to the turbine 5, located on the air intake line 4. A charge air cooler 8 can be situated downstream of the compressor 7.

The exhaust gas generated in each cylinder is collected by an exhaust manifold 9, for example arranged in two halves. The exhaust line 6 connected to the exhaust manifold 9 carries a fraction of the gas (exhaust gas) towards the atmosphere through the turbine 5 of the turbocharger. The exhaust line 6 can be provided with a pollution control device 10 such as a Diesel Particulate Filter (DPF) and/or a SCR catalytic converter. Another fraction of the gas (EGR gas) can be carried by an EGR circuit 11 into the intake line 4. The EGR circuit 11 can be provided with an EGR cooler 12. Thus, exhaust gas is introduced into the engine cylinders with fuel and fresh air with the effect of lowering the oxygen concentration of the intake mix. This ultimately reduces the formation of NOx during combustion in the engine cylinders.

As illustrated on FIG. 1, the internal combustion engine 2 has a set capacity. In other words, the illustrated internal combustion engine has a set displacement; the turbocharger has a set size; therefore the internal combustion engine 2 has a fixed power output that cannot stretch so as to face a peak power demand.

Figure 2:
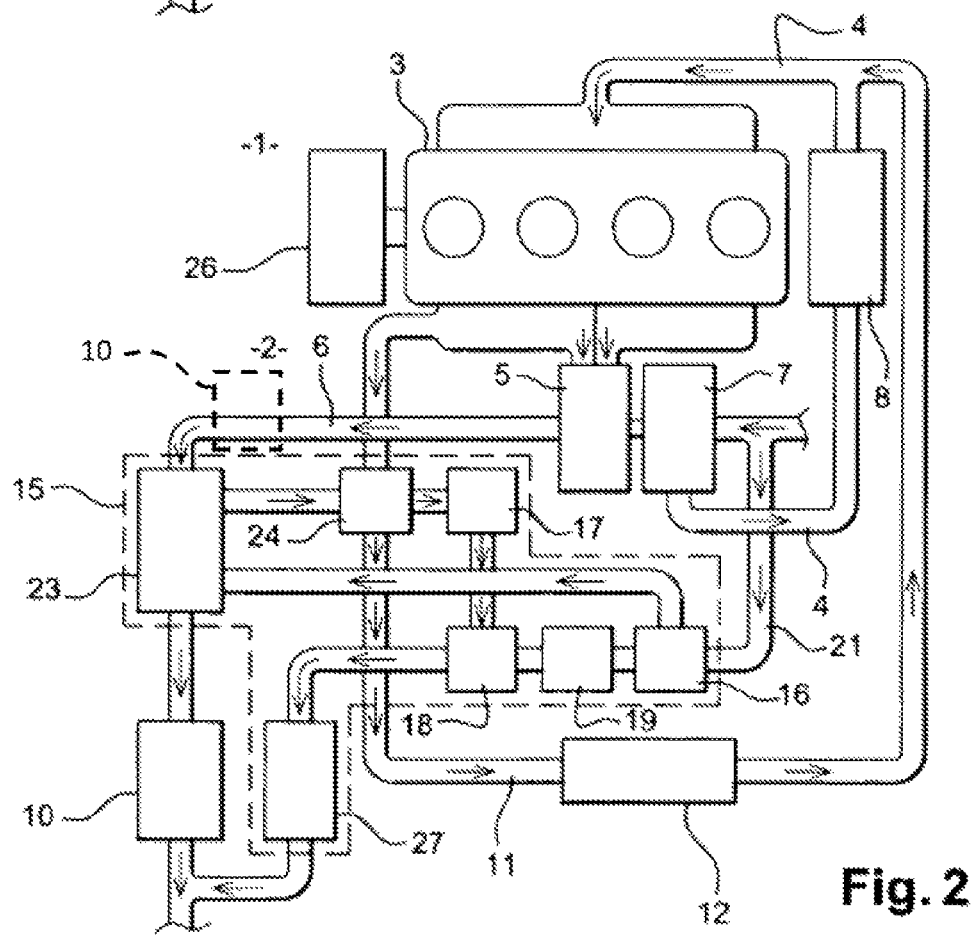
FIG. 2 shows schematically an embodiment of an internal combustion engine according to the invention.

An embodiment of the power assembly 1 according to the invention is shown on FIG. 2 and further includes an additional system which serves the double purpose of recovering heat from the main engine exhaust gas which would otherwise be rejected to the atmosphere, and also to provide additional power means when the power demands exceeds what the main engine can supply in satisfactory conditions.

In the illustrated embodiment of the invention, the internal combustion engine 2 is combined with a Brayton cycle system 15 that can provide an extra capacity while making an efficient use of some of the energy that is normally wasted in a conventional internal combustion engine.

The Brayton cycle system 15 comprise a gas circuit in which gas flows through three main components namely a compressor 16, a fuel burning heater 17 and a turbine 18. The compressor 16 and the turbine 18 are mechanically linked on a shared axle. The Brayton cycle system operates therefore as a gas turbine engine.

In the shown embodiment of FIG. 2 an electromechanical device 19, such as an alternator or a generator, is also linked on this axle as can be seen on FIG. 2. The gas circuit of the Brayton cycle system can suitably comprise a pipe 21 which is branched-off from the intake line 4 downstream of a filtration means but, in the shown embodiment, upstream of the turbine 7. This has the advantage of using the air filtration means of the air intake line 4, although the compressor can be fed by a dedicated air intake.

Pipe 21 first leads to the compressor 16 where it can be compressed.

The pressurized and heated (by compression) air in the conduit 21 can be further heated by running through one or two heat exchangers.

As can be seen on FIG. 2, the main internal combustion engine 2 can be suitably provided with an exhaust heat exchanger 23 situated on the exhaust line. The pressurized air coming from the compressor 16 is led by the pipe 21 to the exhaust heat exchanger where it is further heated by a transfer of heat from the exhaust as of the main engine 2. In the shown embodiment, the exhaust heat exchanger is arranged in the exhaust line 6 upstream of the pollution control device. In some cases, it can be advantageous to arrange the heat exchanger downstream of the pollution control device. In the case where the pollution control device comprises both a DPF and a SCR catalytic converter, it can be advantageous to arrange the heat exchanger 23 downstream of the DPF component of the pollution control device 10 (as seen in phantom in FIG. 2) and upstream of the SCR catalytic converter component.

Further, in addition to or in place of the exhaust heat exchanger 23 the power assembly of the invention can further include a second heat exchanger 24, namely an EGR heat exchanger that is located on the EGR circuit 11. Thus, the pressurized air corning from the exhaust heat exchanger 23 can receive a further amount of heat while flowing in the EGR heat exchanger 24. It can be noticed that the EGR gas is at a high temperature as it is directly flowing from the engine cylinder. The EGR heat exchanger 24 has a beneficial effect on the EGR gas as the EGR gas has to be cooled before entering into the engine cylinders, so that, in some cases or at least at some operating conditions, the EGR cooler 12 could be suppressed, or downsized, or partially or totally by-passed. In the case of an EGR cooler cooled by the engine cooling system, this reduces the burden on the cooling system which can be then of reduced capacity.

After running through the exhaust heat exchanger 23 and/ of through the EGR heat exchanger 24, the pressurized and heated gas is led through a fuel burning heater. The purpose of the fuel burning heater is to further heat the gas flow in the Brayton cycle system, when needed, to be able to retrieve more energy from the system that it would be possible when only the recovery heat recovered through the exhaust heat exchanger and or the EGR heat exchanger would be used. This additional heat is, provided by combustion of fuel, so that the Brayton cycle system then operates as a gas turbine engine.

The fuel burning heater 17 can comprise a combustion chamber where fuel is added to the pressurized and heated air and is burnt.

Alternatively, it could be a simple burner arranged in the pipe 21. The burner can be equipped with a source of oxygen. In both cases the pressurized air flowing in the pipe 21 is used as the oxidant carrier in the combustion process.

As an alternative, it possible to have a fuel burning heater where the combustion process is external to the pipe 21 and where the combustion generated heat is transferred to the gas flowing in the pipe 21 by a heat exchanger.

In all cases, the fuel can suitably be provided by the vehicle fuel circuit. The gas which have been heated by the fuel burning heater are then expanded in the turbine 18.

A share of the work extracted in the turbine 18 is used to drive the compressor 16. In the illustrated embodiment of the invention, the energy is retrieved from the Brayton cycle system through the electromechanical device 19 driven by the turbine 18. The electricity generated by the electromechanical device is fed to an electrical network of the vehicle.

Further, in the shown embodiment, the power assembly is equipped with an electric motor 26 that is linked to the engine crankshaft, thereby forming a parallel hybrid power assembly where the electricity produced by the electromechanical device 19 can be used by the electric motor 26. Of course, the invention would be used in other hybrid architectures, such as in a hybrid series architecture or a hybrid parallel/series architecture where the main engine 2 and the electric motor are each connected to one input of a power split transmission device (such as a planetary gear), the output of which is connected to a driveline of the vehicle.

In addition to or in place of the electrical power retrieval, it can be envisaged to use the work extracted in the turbine 18 by mechanically linking the axle that connects the turbine 18 and the compressor 16 to the vehicle driveline, for example to the main engine crankshaft, through a transmission device, such as in a turbo compound system. The transmission device can include a gear transmission and/or a hydraulic transmission, and/or a continuously variable transmission, and/or a clutch, and/or a hydraulic coupler, etc.

The air and/or the possible combustion products that are released from the fuel burning heater can then undergo a treatment through a specific pollution control component 27 as illustrated on FIG. 2. It is also possible to introduce the air and combustion products released by the burner into the exhaust line upstream of the pollution control device 10, in which case a specific pollution control device is no longer needed.

According to the invention, an internal combustion engine 2 is therefore provided with additional power means that can be turned on when the vehicle operational conditions require so. The power assembly 1 therefore includes a suitable control unit (not illustrated) that is loaded with a program that can send on or off orders to the Brayton cycle system 15 depending on preset parameters such as for example the vehicle speed, the vehicle toad etc. The control unit can also include other conventional components such as a CPU, a ROM, and a RAM, an input interface circuit, an output interface circuit, and the like.

The Brayton cycle system 15 operates according to a known cycle that includes the following three phases: 1) compression, 2) heat addition, 3) expansion. By combining the Brayton cycle system 15 with an internal combustion engine, the invention makes a beneficial use of the heat that is released by the internal combustion engine 2 and that is normally wasted. The overall efficiency of the Brayton cycle system 15 is improved by the fact that the pressurized air is heated not only by flowing through the compressor 16 but also by flowing through the one or two heat exchangers 23 and 24 where further energy is added to the pressurized air.

An important aspect of the invention lies on the use of a Brayton cycle system 15 that makes a use of some of the energy that is normally lost in heat. A further advantage of the invention is that the Brayton cycle system 15 does not require additional cooling capacity. A large share of the heat energy is extracted in the turbine in the form of enthalpy.

Therefore, the power assembly according to the invention provides significant benefits to an automotive vehicle and especially to an industrial vehicle In a first beneficial aspect, a vehicle can be equipped with a downsized main engine that can rely on an additional power capacity provided by a Brayton cycle system 15 by simply turning on the fuel burning heater so that it provides additional heat to the air flow in the Brayton cycle system upstream of the turbine, this additional heat being turned into additional mechanical energy by the turbine 18. Secondly, the additional power capacity provided by a Brayton cycle system 15 (i) makes an efficient use of the energy that is normally wasted in heat in a internal combustion engine and (ii) provokes limited disturbances in the overall architecture of the vehicle engine as it does not require additional cooling capacity. Of course, when the fuel burning heater is turned off, because the main engine able to provide enough power to the vehicle, the Brayton cycle system 15 continues to operate in its role of recovering wasted heat energy in the exhaust gases and/or in the EGR gases. Under such conditions, the Brayton cycle system still provides energy to the vehicle, under electrical or mechanical form, this energy being substantially free. Of course, when the fuel burning heater is turned off, the overall fuel consumption of the power assembly is reduced.

It is to be noted that in addition to being turned off or on, it is also possible to provide that the fuel burning heater is controlled to adjust the amount of additional heat generated by the fuel burning heater and given to the system, for example by adjusting the flow of fuel in the fuel burning heater.

The invention is not limited to the illustrative embodiments described above and shown in the drawings, can be varied within the scope of the following claims.

The invention claimed is:

1. A power assembly, comprising
a main internal combustion engine including an air intake line and an exhaust gas line, and
a Brayton cycle system capable of providing additional power to the main internal combustion engine, the Brayton cycle system including a gas compressor, a fuel burning heater and a turbine linked to the compressor so that air is drawn into the compressor where it is pressurized, the pressurized air is further heated by flowing through at least one heat exchanger where it exchanges heat with exhaust gases from the main internal combustion engine, the heated and pressurized air is further heated by the fuel burning heater and is thereafter expanded through the turbine where a first fraction of the work extracted by the turbine is used to drive the compressor and a second fraction of the work extracted by the turbine is used to provide additional energy,
wherein the internal combustion engine includes an EGR line that recirculates a portion of the exhaust gas back to engine cylinders, the EGR line having an EGR heat exchanger where heat from the EGR gas is transferred to the pressurized air that flows in the Brayton cycle system, and wherein air in the Brayton cycle system is first heated in the at least one heat exchanger, then is heated in the EGR heat exchanger, and then is heated by the fuel burning heater.

2. The power assembly according to claim 1, wherein the exhaust line is provided with a heat exchanger where energy in the form of heat from the internal combustion engine exhaust gas is transferred to the pressurized air that flows in the Brayton cycle system.

3. The power assembly according to claim 2, wherein the heat exchanger in the exhaust line is arranged upstream of a pollution control device including a SCR catalytic converter.

4. The power assembly according to claim 2, wherein the heat exchanger in the exhaust line is arranged downstream of a pollution control device including a diesel particulate filter (DPF).

5. The power assembly according to claim 1, wherein an electromechanical device capable of converting the mechanical work into electrical energy is connected to the turbine.

6. The power assembly according to claim 4, wherein an electric motor powered by the electrical energy extracted by the electromechanical device is connected to the vehicle driveline.

7. The power assembly according to claim 1, wherein a transmission device connects the turbine to the vehicle driveline to transfer the work extracted by the turbine to the internal combustion engine.

8. The power assembly according to claim 1, wherein the power assembly comprises a control unit capable of controlling the operation of the Brayton cycle system according to vehicular operational parameter.

9. The power assembly according to claim 8, wherein the control unit controls the operation of the fuel burning heater to turn it on or off.

10. The power assembly according to claim 9, wherein the control unit controls the amount of heat generated by the fuel burning heater.

11. The power assembly according to one claim 1, wherein the heated air and combustion products produced in the fuel burning heater flow through a pollution control component situated downstream of the turbine.

12. The power assembly according to claim 1, wherein the internal combustion engine is equipped with a turbocharger.

13. The power assembly according to claim 1, wherein the internal combustion engine is a diesel engine.

* * * * *

UNITED STATES PATENT AND TRADEMARK OFFICE
CERTIFICATE OF CORRECTION

PATENT NO. : 8,726,656 B2
APPLICATION NO. : 13/063984
DATED : May 20, 2014
INVENTOR(S) : Marc Lejeune It is certified that error appears in the above-identified patent and that said Letters Patent is hereby corrected as shown below:

On the Title Page item (75),
Inventor's city name incorrectly spelled as "Lyons" and it should be spelled as --Lyon--.

Signed and Sealed this
Fifteenth Day of July, 2014

Michelle K. Lee
*Deputy Director of the United States Patent and Trademark Office*